(12) United States Patent
Bonanni et al.

(10) Patent No.: US 11,970,190 B2
(45) Date of Patent: Apr. 30, 2024

(54) AUTONOMOUS VEHICLE STATIONS

(71) Applicant: MOTIONAL AD LLC, Boston, MA (US)

(72) Inventors: Taigo Maria Bonanni, Singapore (SG); Abhimanyu Singh, Singapore (SG)

(73) Assignee: Motional AD LLC, Boston, MA (US)

( * ) Notice: Subject to any disclaimer, the term of this patent is extended or adjusted under 35 U.S.C. 154(b) by 301 days.

(21) Appl. No.: 17/202,600

(22) Filed: Mar. 16, 2021

(65) Prior Publication Data

US 2022/0024494 A1  Jan. 27, 2022

Related U.S. Application Data

(60) Provisional application No. 63/056,773, filed on Jul. 27, 2020.

(51) Int. Cl.
*B60W 60/00* (2020.01)
*B25J 18/00* (2006.01)
(Continued)

(52) U.S. Cl.
CPC ........ *B60W 60/00256* (2020.02); *B25J 18/00* (2013.01); *B60L 53/12* (2019.02);
(Continued)

(58) Field of Classification Search
CPC .......... B60W 60/00256; B60W 30/06; B60W 50/0205; B60W 50/06; B60W 40/12; B60W 2050/0215; B60W 2050/0002; B60W 2420/00; B60W 2556/45; B60W 30/10; B60W 60/001; B60W 40/02;
(Continued)

(56) References Cited

U.S. PATENT DOCUMENTS 5,456,562 A    10/1995  Schlecker et al.
5,669,753 A     9/1997  Schween
(Continued)

FOREIGN PATENT DOCUMENTS

DE    102016219455 A1    4/2018
DE    202020101526 U1    4/2020
(Continued)

OTHER PUBLICATIONS

Grobe et al., WO2020126371A1_Machine Translation, 2020 (Year: 2020).*

(Continued)

*Primary Examiner* — Jelani A Smith
*Assistant Examiner* — Alyssa Rorie
(74) *Attorney, Agent, or Firm* — Fish & Richardson P.C.

(57) ABSTRACT

Among other things, techniques are described for operating an autonomous vehicle station. One technique involves receiving information indicating arrival of a vehicle at a station designated for a primary service. The technique further involves measuring, using at least one sensor located in the station, a first parameter associated with the vehicle. Also, the technique involves performing, based on the information and the first parameter, a first action to provide the primary service to the vehicle. Additionally, the technique involves determining, while performing the first action, a secondary service to provide to the vehicle.

20 Claims, 18 Drawing Sheets

(51) Int. Cl.
  *B60L 53/12* (2019.01)
  *B60W 30/06* (2006.01)
  *B60W 50/02* (2012.01)
  *B60W 50/06* (2006.01)
  *G01C 21/34* (2006.01)
  *G06F 16/953* (2019.01)
  *G06Q 30/04* (2012.01)

(52) U.S. Cl.
  CPC ........ *B60W 30/06* (2013.01); *B60W 50/0205* (2013.01); *B60W 50/06* (2013.01); *G01C 21/3407* (2013.01); *G01C 21/3453* (2013.01); *G06F 16/953* (2019.01); *G06Q 30/04* (2013.01)

(58) Field of Classification Search
  CPC ... B60W 2050/0005; B60W 2050/0083; G06F 16/953; G06F 16/2457; G06F 21/32; G06F 9/06; B60L 53/12; B60L 2260/32; B60L 53/14; B60L 53/68; B60L 53/36; B60L 53/63; B25J 18/00; B25J 11/008; G01C 21/3407; G01C 21/3453; G01C 21/3438; G06Q 30/04; G06Q 50/30; Y02T 10/7072; Y02T 10/70; Y02T 90/12; Y02T 90/14; Y02T 90/16; G05D 1/0236; G05D 1/0214; G05D 1/0221; G05D 1/0223; G05D 1/024; G05D 1/0242; G05D 1/0251; G05D 1/0255; G05D 1/0257; G05D 1/0259; G05D 1/0261; G05D 1/0276; G05D 1/0278; G05D 1/028; G05D 1/0289; G05D 2201/02; B60S 5/00; E04H 6/282; E04H 6/28

See application file for complete search history.

(56) References Cited

U.S. PATENT DOCUMENTS

| | | |
|---|---|---|
| 2005/0220594 A1 | 10/2005 | Haag |
| 2011/0274523 A1 | 11/2011 | Petalas |
| 2015/0348335 A1 | 12/2015 | Ramanujam et al. |
| 2017/0323565 A1* | 11/2017 | Nordbruch ......... G01C 21/3685 |
| 2018/0284807 A1 | 10/2018 | Wood et al. |
| 2018/0345811 A1 | 12/2018 | Michels et al. |
| 2019/0047523 A1 | 2/2019 | Lee |
| 2019/0250636 A1 | 8/2019 | Szubbocsev et al. |
| 2020/0005059 A1* | 1/2020 | Yamada .................. H04N 7/18 |
| 2020/0104964 A1* | 4/2020 | Yasui ..................... G06Q 50/30 |
| 2020/0198594 A1* | 6/2020 | Petershagen ............ B60L 53/60 |
| 2020/0201355 A1* | 6/2020 | Colijn .................. G05D 1/0291 |
| 2020/0290650 A1* | 9/2020 | Suzuki ................. G05D 1/0212 |
| 2021/0248386 A1* | 8/2021 | Takato ................... G08G 1/146 |
| 2022/0018932 A1* | 1/2022 | Yamamoto ............ G01S 13/867 |
| 2022/0101459 A1* | 3/2022 | Hwang .................. G06Q 20/22 |
| 2022/0414612 A1* | 12/2022 | Lorenz .................. G06Q 10/20 |

FOREIGN PATENT DOCUMENTS

| | | | |
|---|---|---|---|
| DE | 102018222567 A1 | 6/2020 | |
| DE | 102020101118 A1 | 7/2020 | |
| JP | H11-280285 A | 10/1999 | |
| JP | 2002-334166 A | 11/2002 | |
| JP | 2004-345862 A | 12/2004 | |
| JP | 2017-531781 A | 10/2017 | |
| KR | 2017-0042963 A | 4/2017 | |
| WO | WO-2020126371 A1 * | 6/2020 | ............... B60S 3/00 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

* cited by examiner

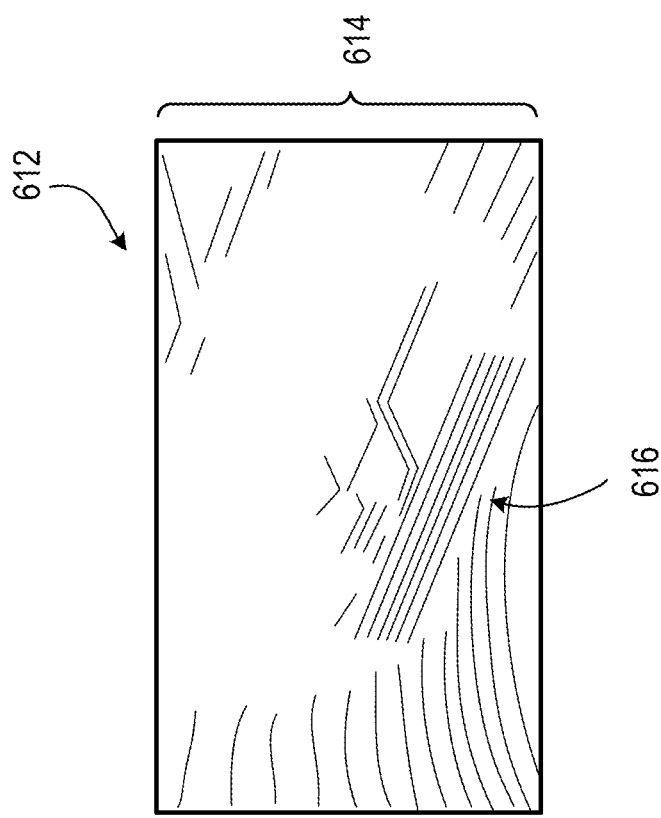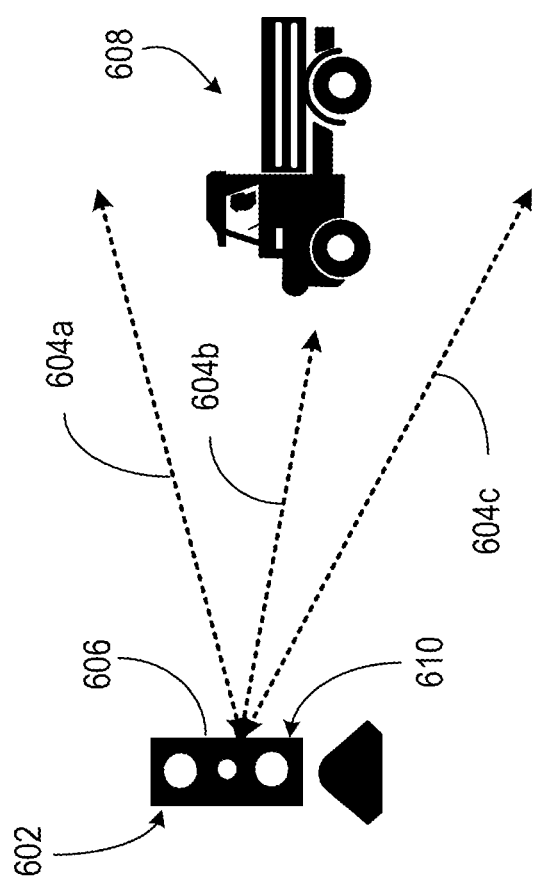
FIG. 6

AUTONOMOUS VEHICLE STATIONS

CROSS-REFERENCE TO RELATED APPLICATIONS

This application is a Utility from Provisional of U.S. Application Ser. No. 63/056,773, filed Jul. 27, 2020, of which are incorporated by reference.

FIELD OF THE INVENTION

This description relates to autonomous vehicle stations.

BACKGROUND

Vehicle service stations provide vehicle related services to vehicle operators. The vehicle related services include vehicle repair and servicing vehicles with gasoline and oil.

BRIEF DESCRIPTION OF THE DRAWINGS

FIG. 6 shows an example of a LiDAR system.

DETAILED DESCRIPTION

Figure 1:
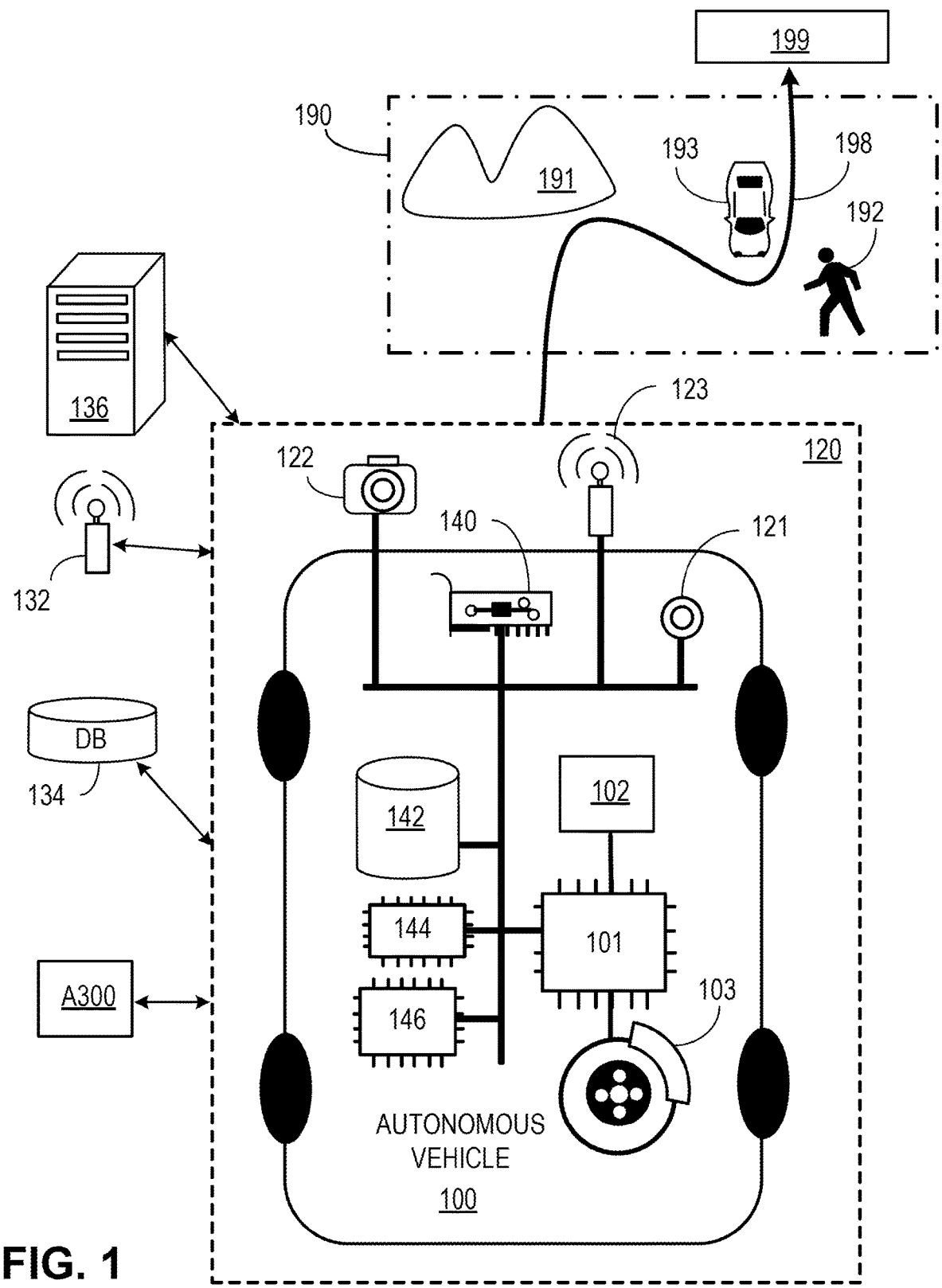
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Autonomous Vehicle Station
8. Network of Autonomous Vehicle Stations
9. Operation of an Autonomous Vehicle Station General Overview AV stations, which are locations regularly visited by autonomous vehicles, can be used to perform service actions (e.g. performing sensor calibration, performing vehicle analysis, charging vehicle batteries, etc.) even if the location is not a dedicated service station. For example, the service locations can be designated for primary activities such as passenger pickup/drop-off, safe AV storage (e.g., long or short term), and a safe location for conducting transactions. In an embodiment, the system also includes a central server that coordinates operations across the network of service locations by communicating with AVs and with local servers at the service locations. In the event of a malfunction or emergency, an AV could travel to a nearby service location for emergency maintenance and/or reconfiguration of the AV's settings Some of the advantages of the service system include improving efficiency of services provided to autonomous vehicles by providing various services tailored to autonomous vehicles in convenient locations and at convenient times. Additionally, the service system, by detecting issues with autonomous vehicles at an early stage, improves the reliability and performance of autonomous vehicles. Furthermore, the service system improves the efficiency of computing devices that support autonomous vehicles by providing default settings in case of emergencies or malfunctions.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pick-up trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
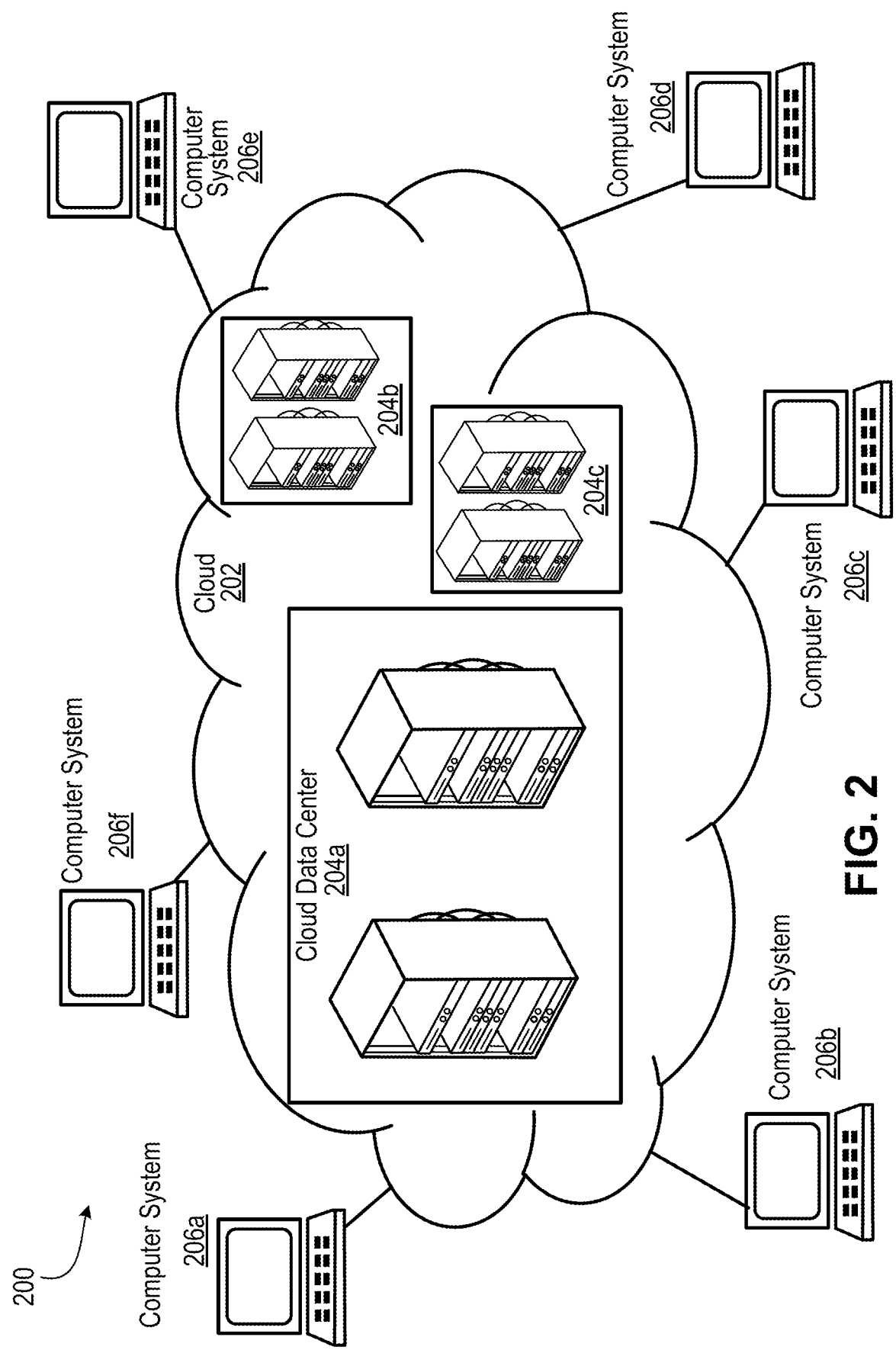
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
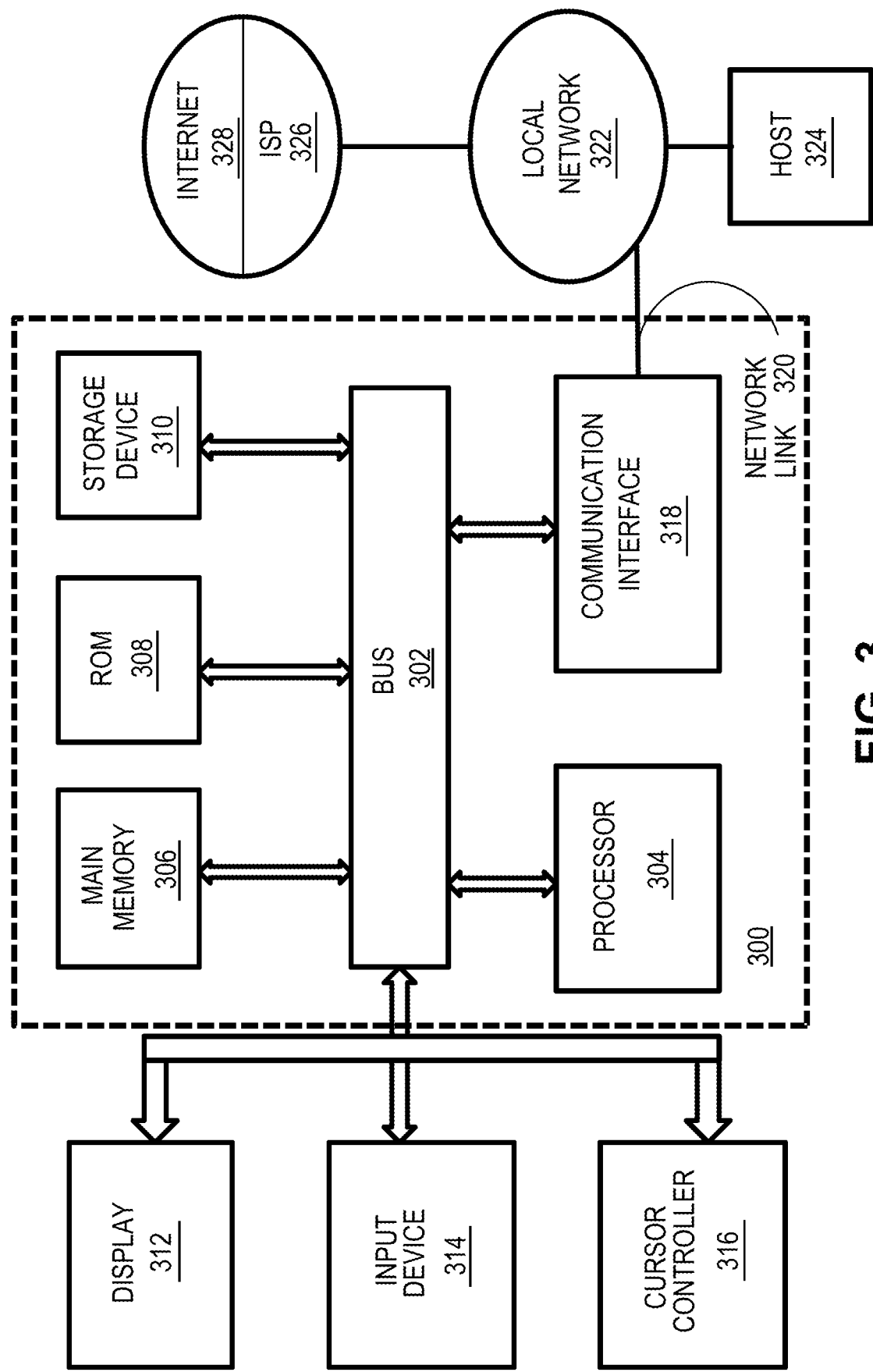
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
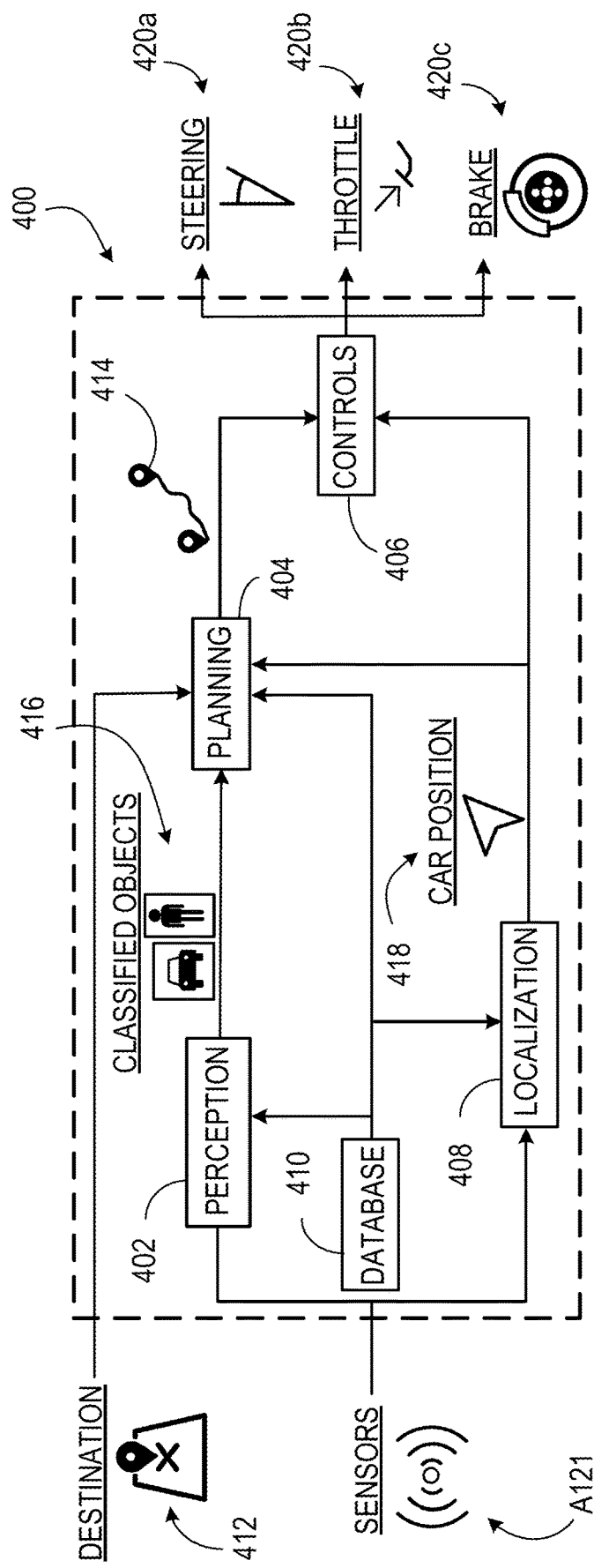
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
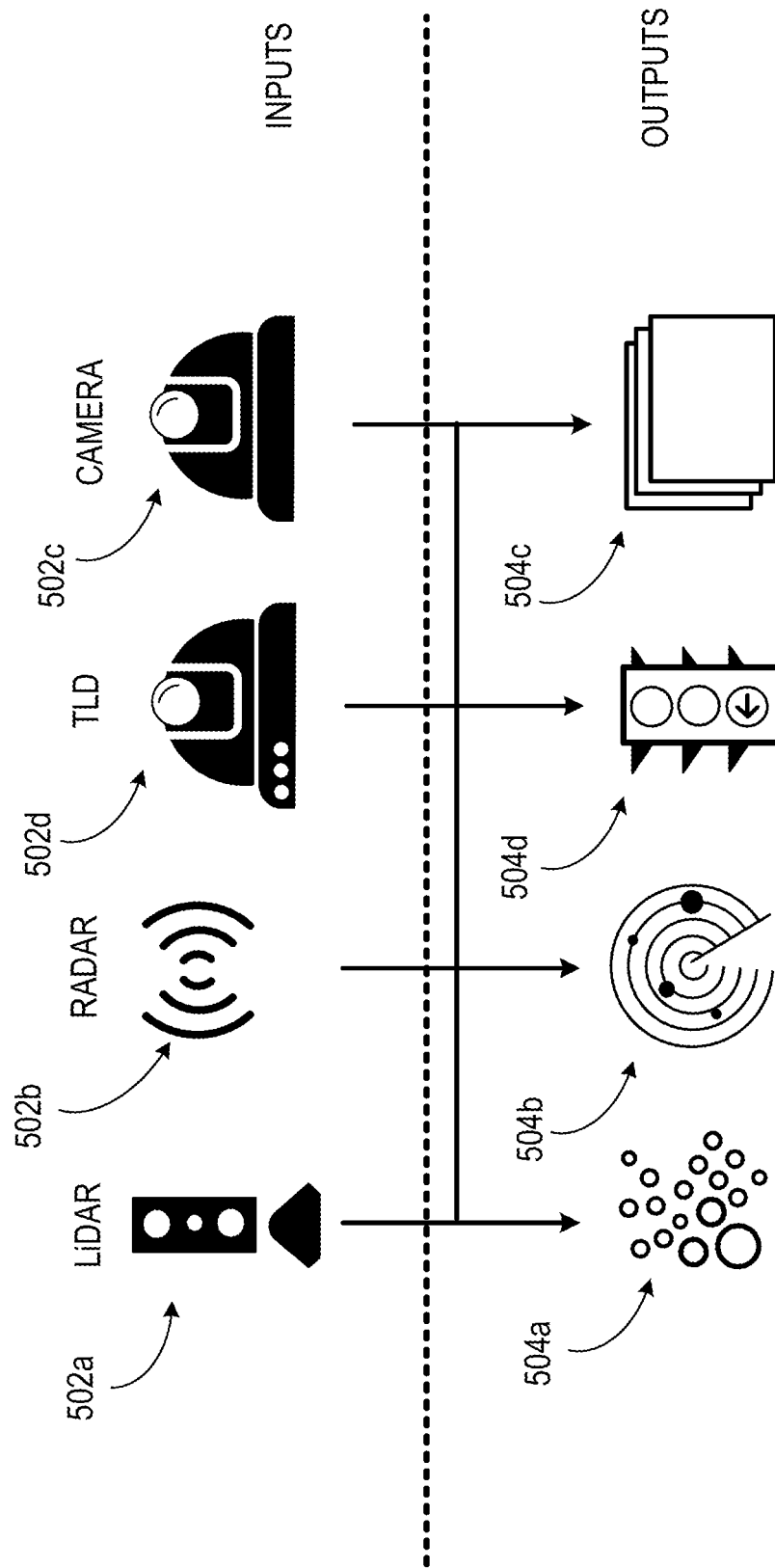
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
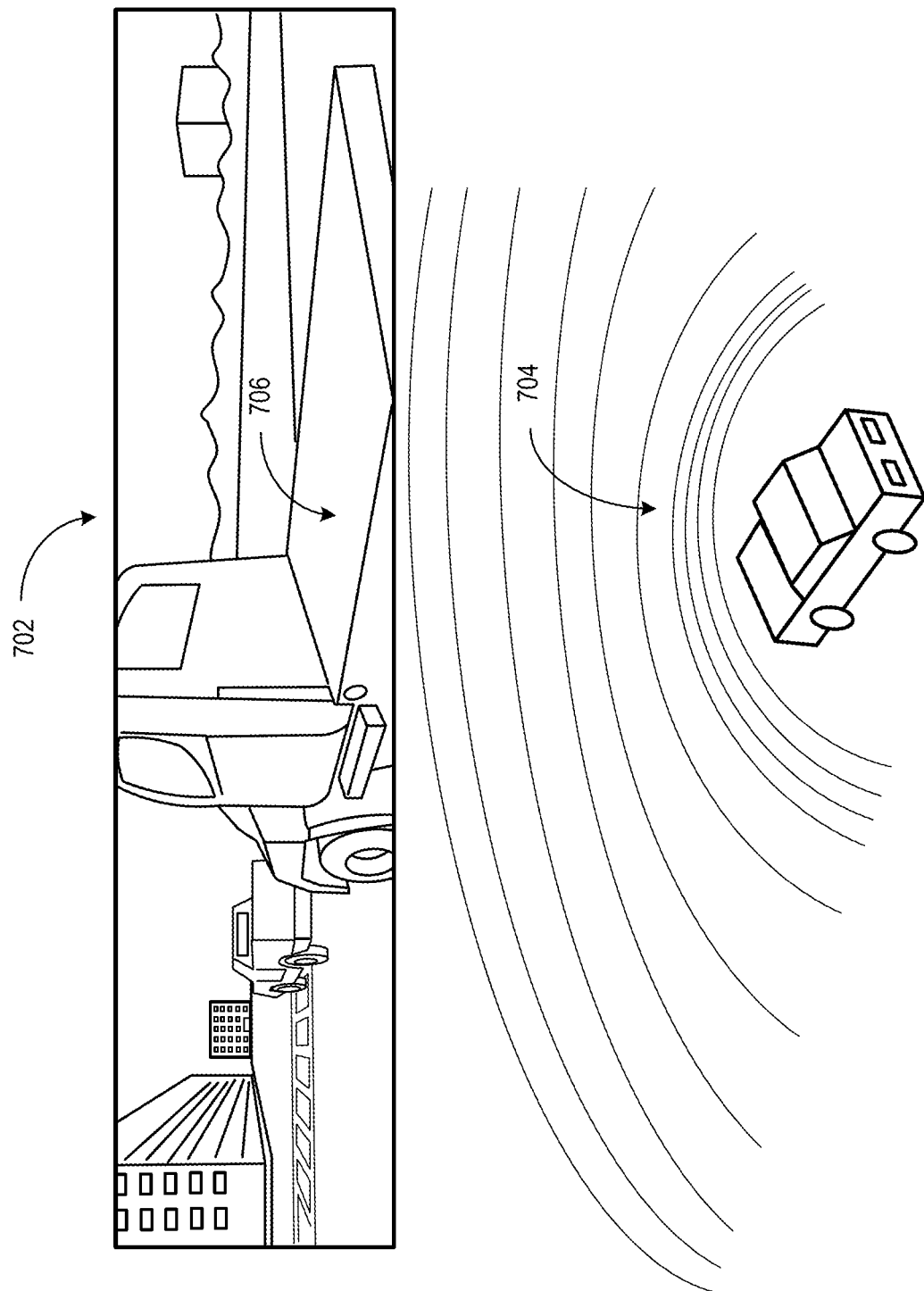
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
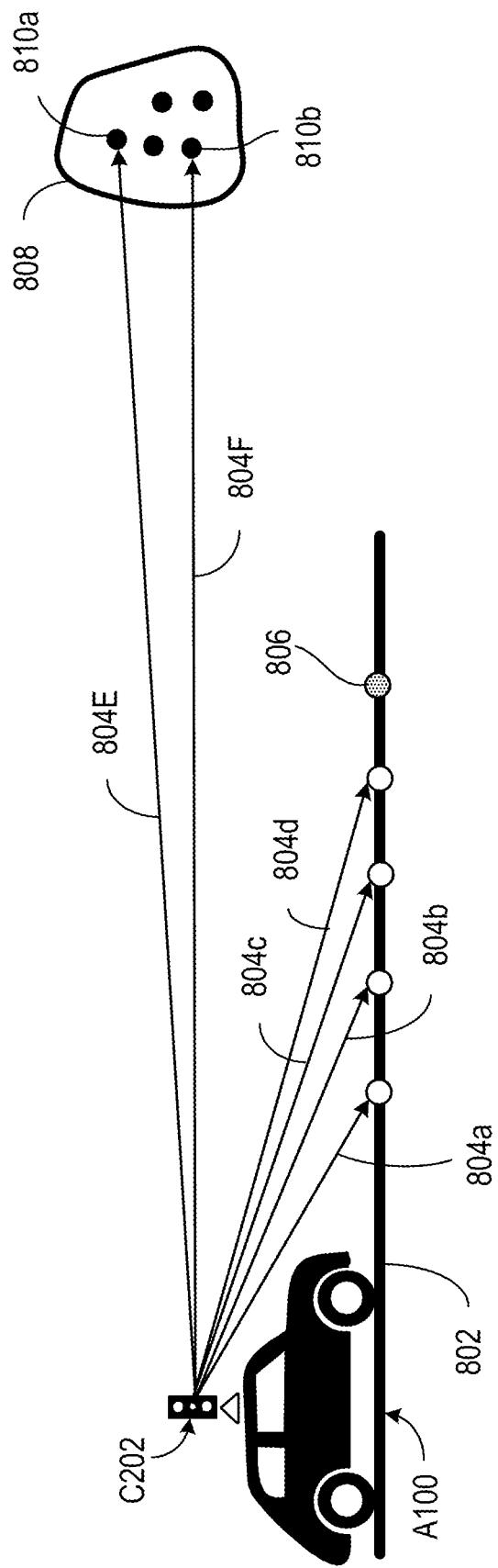
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
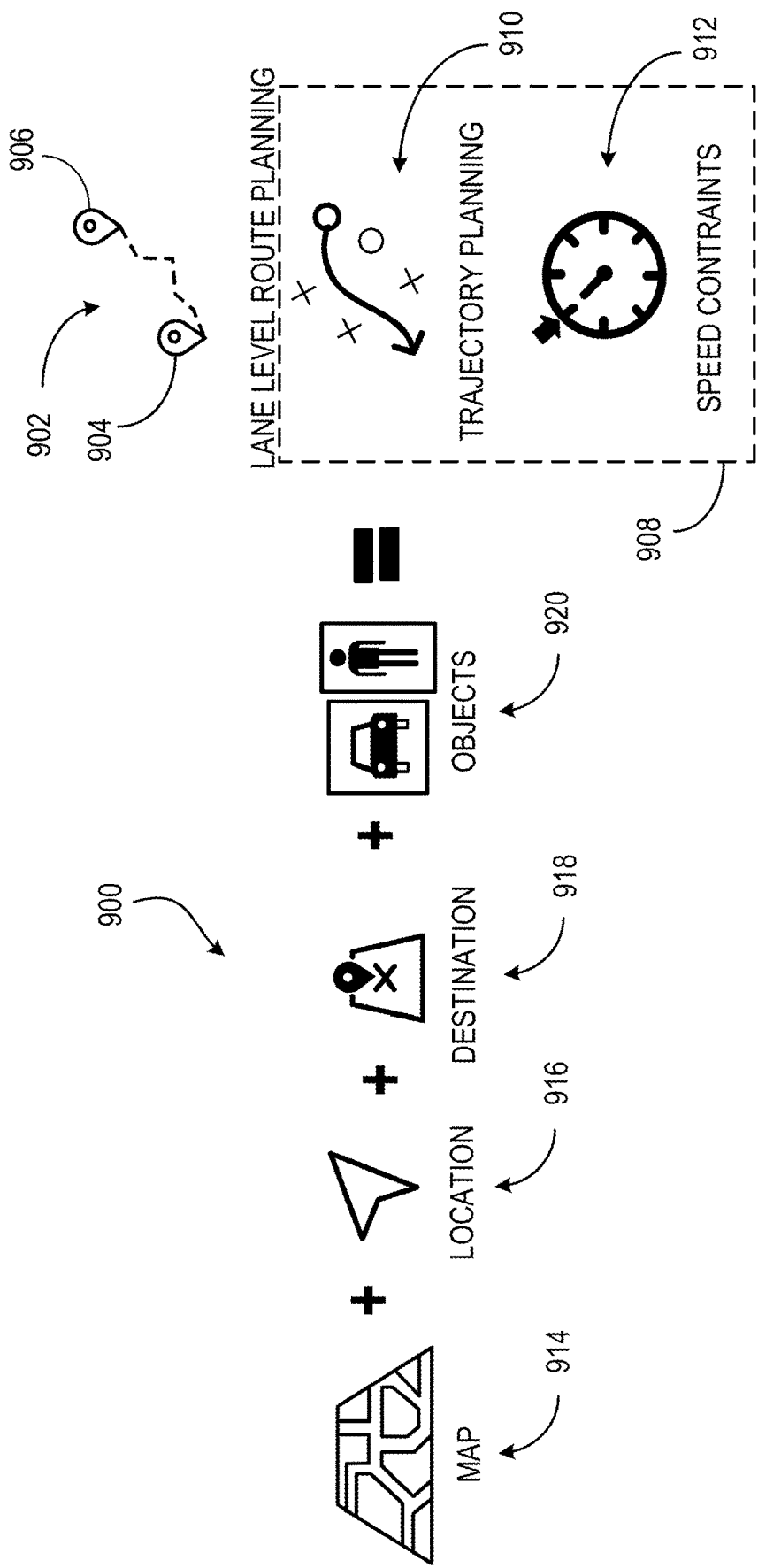
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
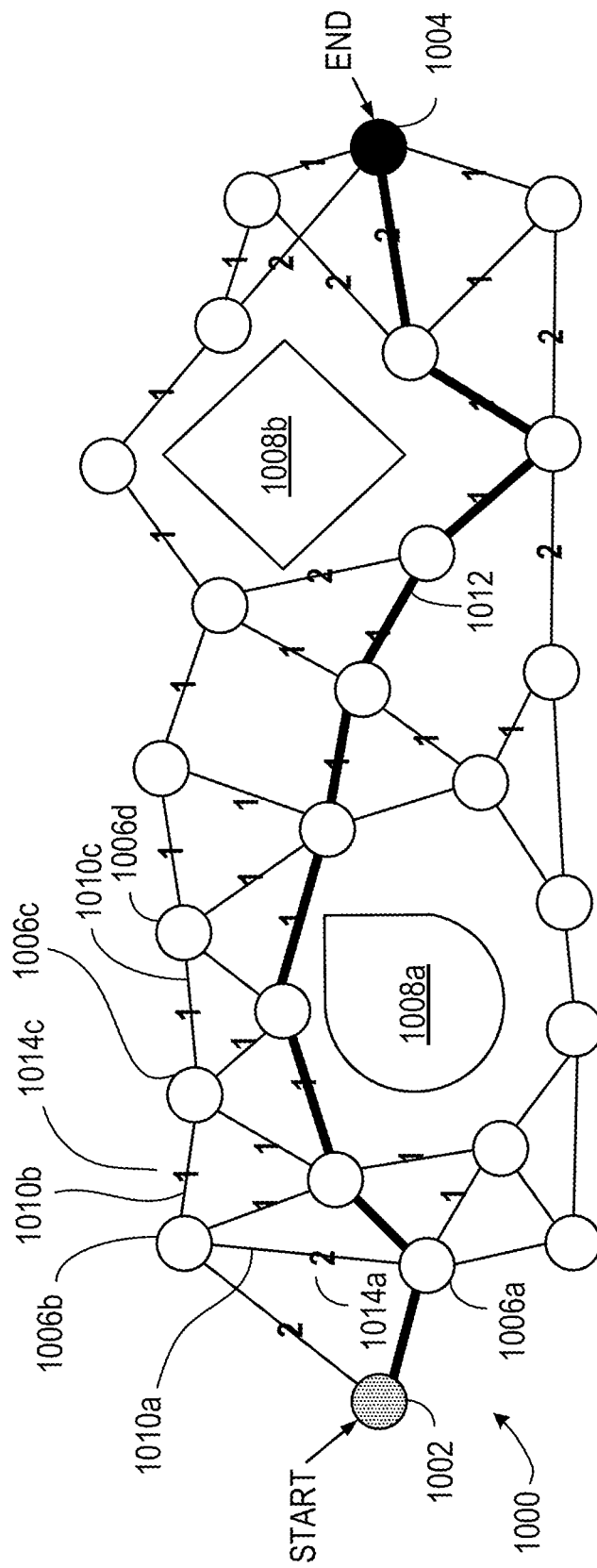
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
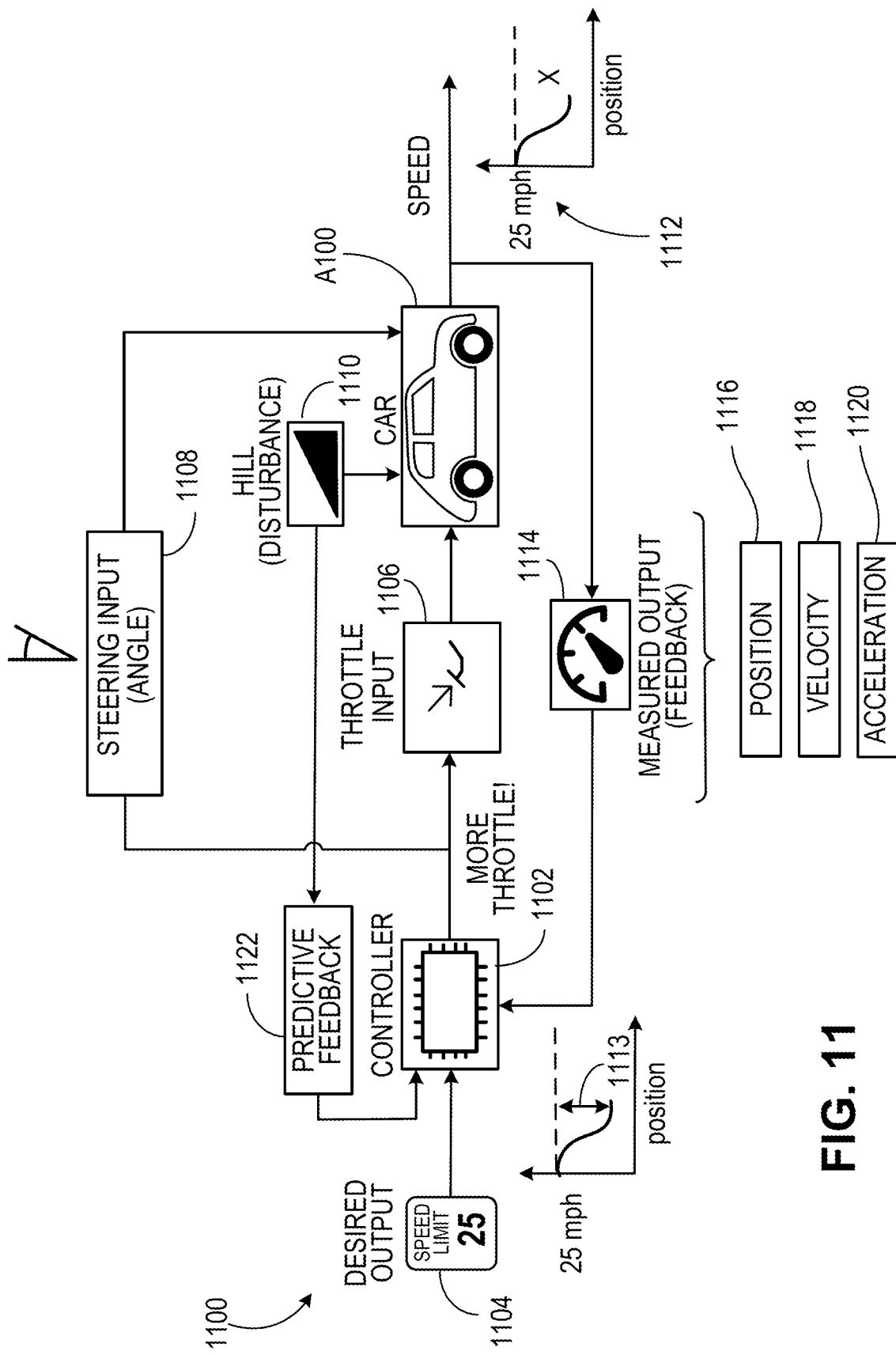
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
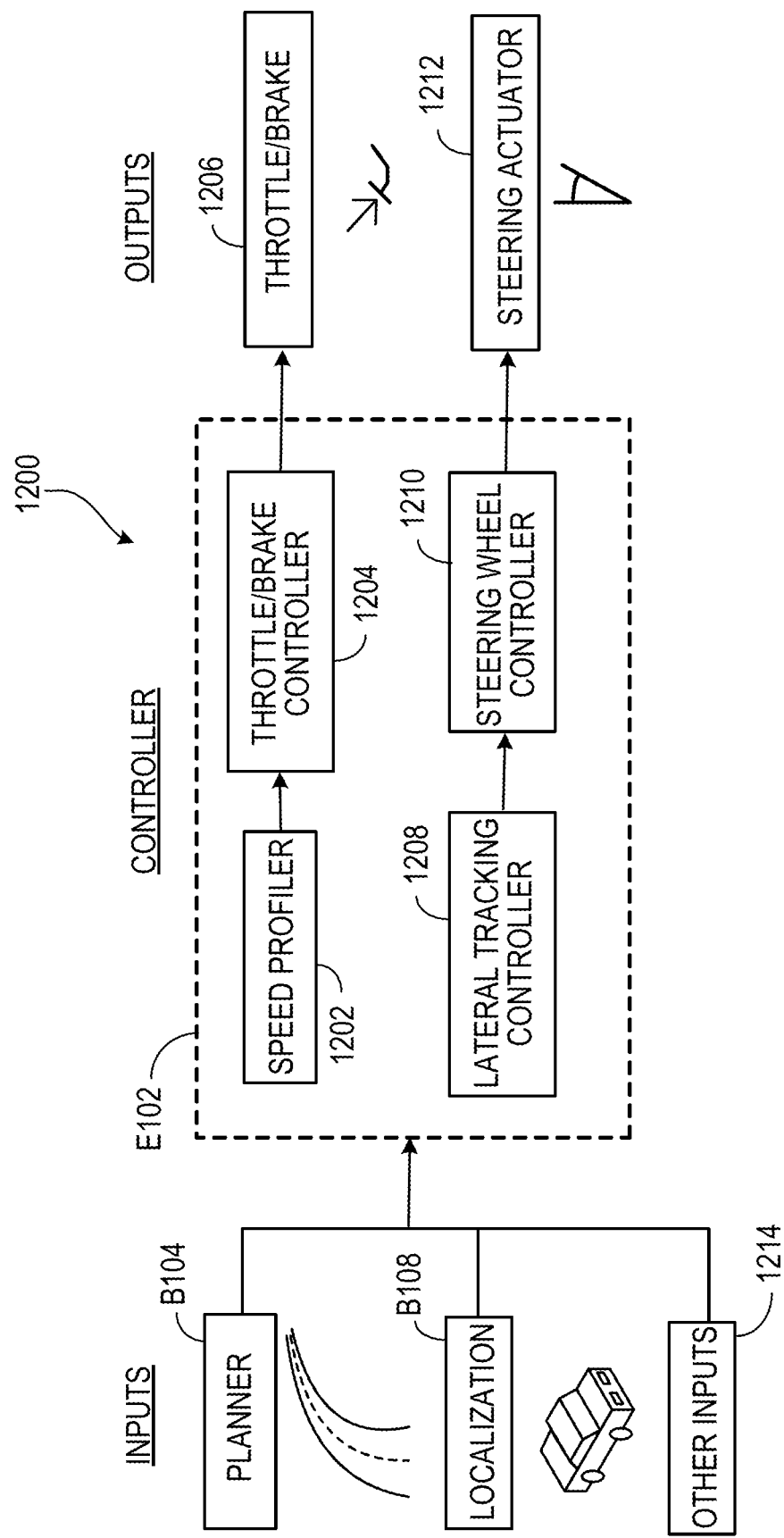
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Autonomous Vehicle Station

Figure 13:
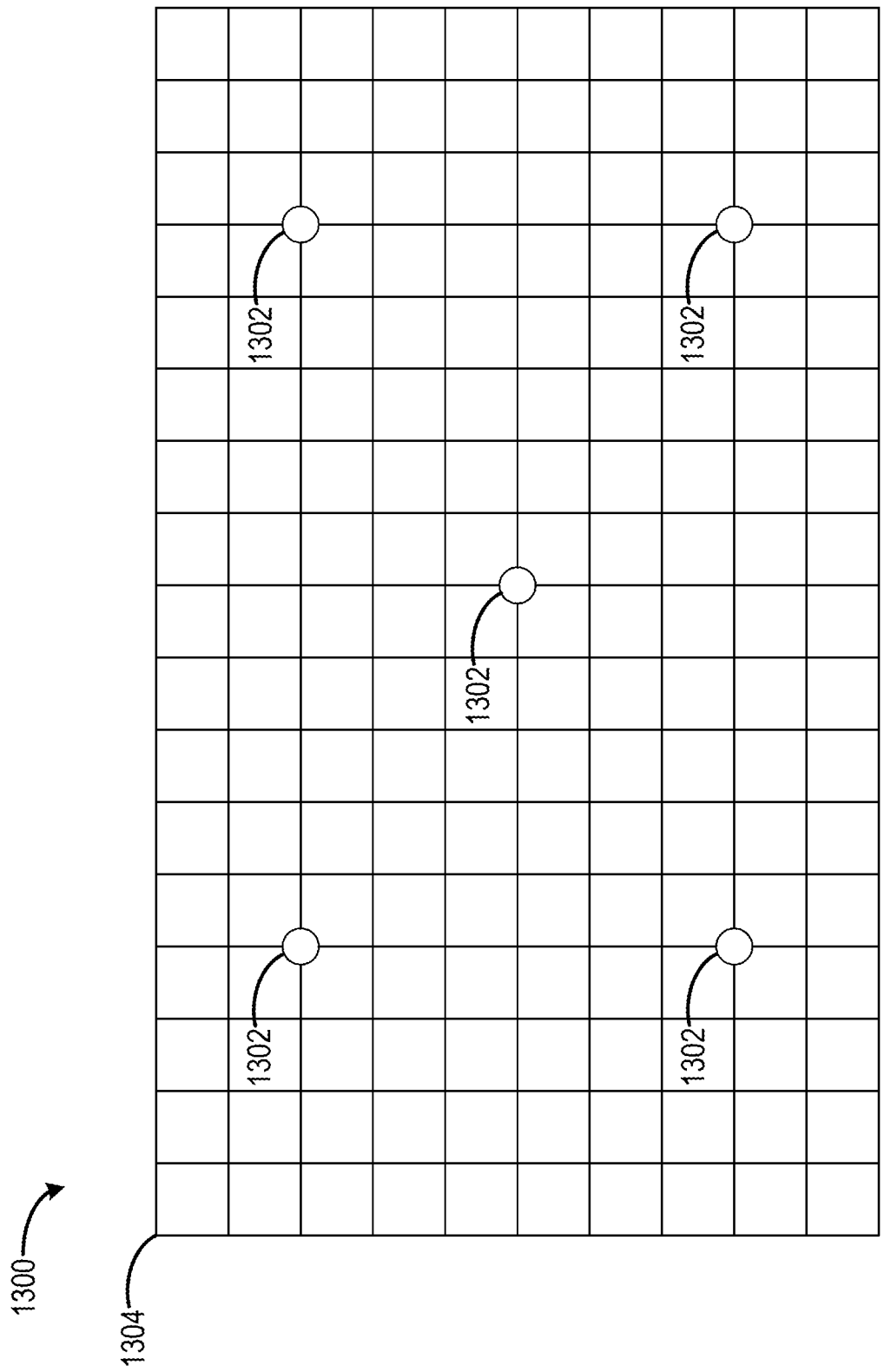
FIG. 13 shows a map of a network of autonomous vehicle stations in a geographic region.

FIG. 13 shows a map 1300 of a network of autonomous vehicle (AV) stations 1302 in a geographic region 1304. Primary services, such as pick-up/drop-off, AV storage, and a safe transaction location, may be offered at the AV stations 1302. The locations of the AV stations 1302 are strategically determined in order to provide convenient access to the stations. By way of example, the locations of the AV stations 1302 may be selected in central areas of the geographic region 1304 or near transportation facilities (e.g., airport, train station, boat dock, mass transit, bus station, and light rail). Additionally and/or alternatively, the locations of the AV stations 1302 are selected at specified intervals within the geographic region 1304. For example, the locations of the AV stations 1302 are selected such that an AV within the borders of the geographic region 1304 is always within a threshold distance from a station.

In an embodiment, the AV stations 1302 are accessed by several types of AVs, such as AVs affiliated with the AV stations 1302 and AVs not affiliated with the AV stations 1302. The AVs may be transporting customers and/or associated objects to the AV stations 1302 in order to receive a primary service, which is provided to the customers based on a subscription model or a pay-per-use model. AVs affiliated with the network are part of an affiliated AV fleet that transports customers to/from the AV stations 1302. The non-affiliated AVs include corporate AV fleets or private AVs.

Because of the strategic locations of the AV stations 1302, they are regularly visited by AVs (whether affiliated or non-affiliated AVs). Accordingly, in an embodiment, the AV stations 1302 are configured to offer secondary services to AVs while the AVs are at the stations in connection with a primary service. The secondary services include, for example, sensor calibration, vehicle analysis, vehicle charging, and vehicle repair. Thus, the AV stations 1302 can be used to perform repair or maintenance actions even if the stations are not dedicated repair stations. Some of the advantages of such a network of AV stations include improving efficiency of services provided to AVs by providing various services tailored to AVs in convenient locations and at convenient times. Additionally, the network of AV stations, by detecting issues with AVs at early stages, improves the reliability and performance of AVs.

Figure 14:
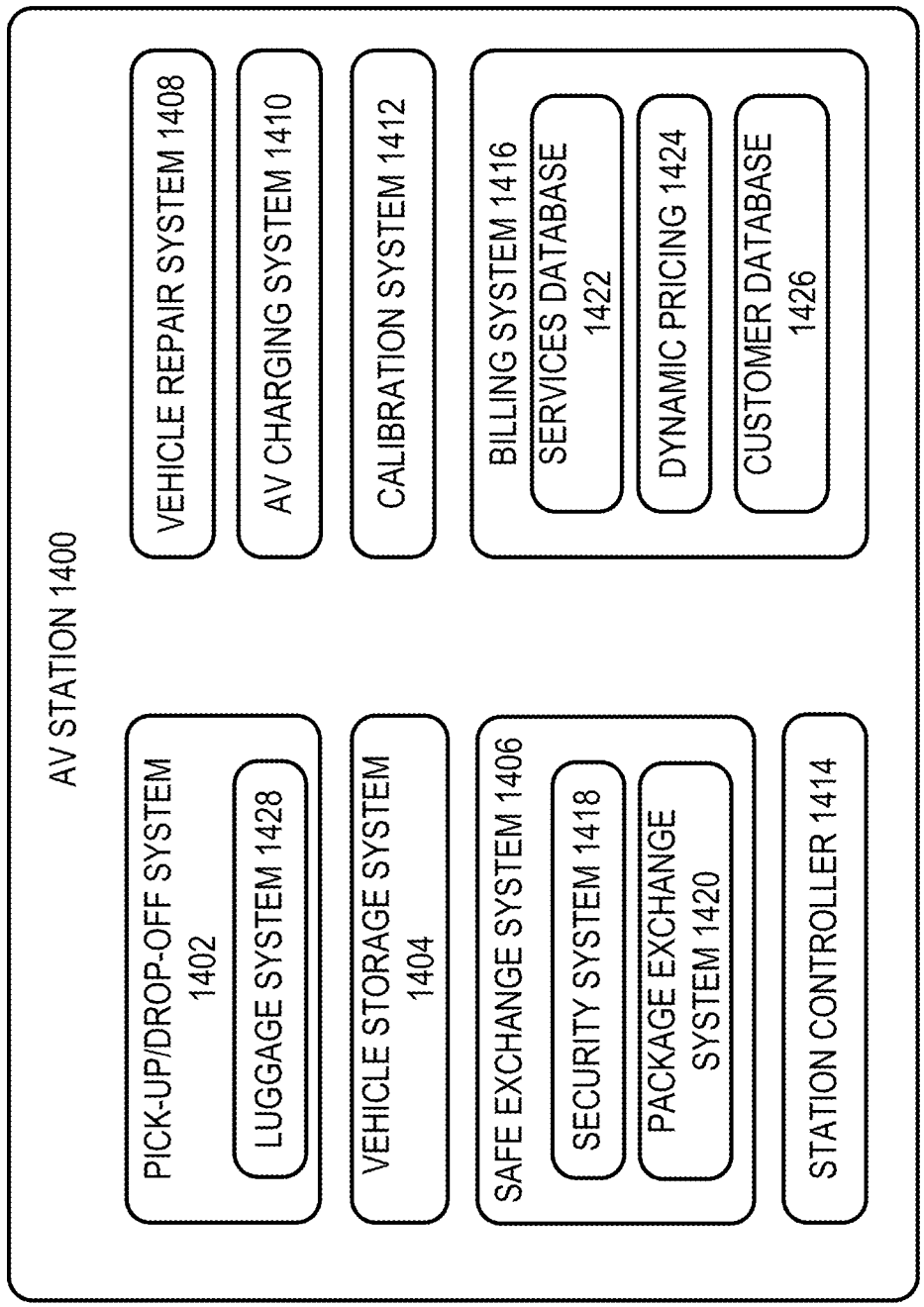
FIG. 14 shows a block diagram of an example autonomous vehicle station.

FIG. 14 shows a block diagram of an autonomous vehicle station 1400. Like the AV stations 1302 of FIG. 13, the AV station 1400 may be part of a network of AV stations. The AV station 1400 offers one or more primary services, and one or more secondary services that can be performed while an AV is at the station in connection with a primary service. Depending on the primary services that are offered by the AV station 1400, the station includes one or more of a pick-up/drop-off system 1402, a vehicle storage system 1404, and a safe transaction system 1406. Further, depending on the secondary services offered by the AV station 1400, the station includes one or more of a vehicle repair system 1408, an AV charging system 1410, and a calibration system 1412. Yet further, the AV station 1400 includes a station controller 1414 and a billing system 1416. Within examples, the systems associated with the secondary services may be placed at the same location as or near the systems associated with the primary services. Doing so facilitates performing the secondary services at or nearly the same time as the primary services, thereby reducing any delay caused by the secondary services.

In an embodiment, the pick-up/drop-off system 1402 enables a pick-up/drop-off service. The pick-up/drop-off service provides customers with a convenient location from which to transfer to other modes of transportation. The pick-up/drop-off system 1402 includes infrastructure, devices, and equipment that support the pick-up/drop-off service. The infrastructure includes waiting areas, check-in counters, and designated areas for pick-up/drop-off. Additionally, as shown in FIG. 14, the pick-up/drop-off system 1402 includes a luggage system 1428 that includes one or more devices for manipulating or moving objects (e.g., luggage or packages). The luggage system 1428 includes conveyer belts for transporting objects to/from other areas (e.g., airline check-in counters) and robotic devices configured to manipulate or move objects (e.g., using end-effectors). For example, the luggage system 1428 includes a robotic picker configured to autonomously identify objects and move them from/to an AV. The robotic picker may also remove objects from/to a conveyor belt.

In an embodiment, the pick-up/drop-off system 1402 communicates with other systems in order to obtain information that aids in performing the pick-up/drop-off service. As an example, the pick-up/drop-off system 1402 obtains information indicating a destination of an object. More specifically, when unloading luggage from an AV, the pick-up/drop-off system 1402 determines travel information for the customer so that the luggage is properly routed (e.g., to a check-in counter). Alternatively, when the pick-up/drop-off system 1402 receives luggage (e.g., from an arrivals carousel) for loading into an AV, the pick-up/drop-off system 1402 determines (e.g., from a customer associated with the luggage) identifying information of the AV into which the luggage is to be loaded.

In an embodiment, the vehicle storage system 1404 enables an AV storage service. The vehicle storage system 1404 includes infrastructure, devices, and/or equipment for storing AVs. The vehicle storage system 1404 includes one or more of a parking structure, an automated parking system, a vehicle turntable, a vehicle elevator or lift, and sensors for security or for determining AV dimensions for automated parking. When an AV arrives at the AV station 1400 for vehicle storage, the vehicle storage system 1404 uses the automated parking system to select a parking spot for the AV. The vehicle storage system 1404 then transports the AV to the parking spot, perhaps using the vehicle turntable and the vehicle elevator.

In an embodiment, the safe transaction system 1406 enables a safe transaction service and allows AV users to safely conduct legitimate transactions with other AV users. As shown in FIG. 14, the safe transaction system 1406 includes a security system 1418 and a package exchange system 1420. The security system 1418 includes one or more sensors (e.g., cameras, infrared sensors, motion sensors), and may be operating continuously or may be activated upon arrival of an AV. The security system 1418 also identifies and verifies the parties that arrive at the AV station 1400 to conduct a transaction. The package exchange system 1420 includes an object manipulator (e.g., a robotic picker) that is configured to remove an object from one AV and place it in another AV. The package exchange system 1420 also includes package storage containers where a package may be stored for later pick-up by an AV.

In an embodiment, the vehicle repair system 1408 enables a vehicle repair service. The vehicle repair system includes infrastructure, devices, and equipment for performing diagnostic actions, maintenance actions, and repairs on AVs. The vehicle repair system 1408 includes diagnostic tools (e.g., an on-board diagnostic systems [OBD] diagnostic code reader), maintenance tools, and repair tools. Among other actions, the vehicle repair system 1408 performs wheel alignment measurements, brake testing, tire tread depth measurements, tire pressure testing, sensor calibration, AV battery testing, analysis of AV diagnostic codes, and software updates.

In an embodiment, the AV charging system 1410 enables an AV charging service. The AV charging system 1410 includes one or more wired and/or wireless chargers that are configured to charge AV batteries through wired and/or wireless connections.

In an embodiment, the calibration system 1412 enables a calibration service and includes one or more calibration targets for calibrating AV sensors. The targets have one of several shapes including, but not limited to, a spherical shape, a cubical shape, a cuboidal shape, a conical shape, a toroidal shape, a triangular shape, a cylindrical shape, a pyramidal shape, or any one of multiple shape primitives. Further, the targets have a substantially non-reflective portion and a substantially reflective portion. The targets are configured to calibrate several types of sensing devices. For example, the sensors include the sensors 121 discussed previously with reference to FIG. 1, including, but not limited to, LiDAR, cameras (e.g., a monocular or stereo video camera), ultrasonic sensor, RADAR, time-of-flight (TOF) depth sensors, and speed sensors.

In an embodiment, the station controller 1414 controls operations of the AV station 1400. The station controller 1414 includes one or more processor(s), data storage, and program instructions. The station controller 1414 may be incorporated in whole or in part into one of the systems of the AV station 1400 or may take the form of a desktop computer, a laptop, a tablet, a wearable computing device, and/or a mobile phone, among other possibilities.

In an embodiment, the station controller 1414 detects arrival of an AV at the AV station 1400. In an example, the station controller 1414 receives information indicating arrival of the AV from a central computing system (described in further detail in FIG. 16). In another example, the station controller 1414 detects arrival of the AV using one or more sensors (e.g., motion sensors or cameras) at the AV station 1400. Once the station controller 1414 has detected arrival of the AV, the station controller 1414 determines a primary service to be performed in connection with the AV. In an example, the station controller 1414 receives information indicative of the primary service from the central computing system. In another example, the station controller 1414 communicates with the AV or with a customer associated with the AV in order to determine the primary service.

Once the station controller 1414 has determined the primary service, the controller provides instructions to the relevant system to perform the primary service. While the primary service is being performed, the station controller 1414 determines one or more secondary services to be performed in connection with the AV. In particular, the station controller 1414 determines the one or more secondary services based on one or more factors, such as a type of the AV (e.g., an affiliated AV or a non-affiliated AV), default secondary services, and sensor data (e.g., an initial diagnostic scan of the AV). In some examples, the station controller 1414 communicates with the customer in order to receive approval for the secondary services. Upon approval, the station controller 1414 provides instructions to the relevant systems to perform the one or more secondary service.

The following examples illustrate selection of secondary services for an AV. In a first example, a personal AV arrives at the AV station 1400 for a primary service (e.g., vehicle storage). Upon arrival, the station controller 1414 causes the vehicle repair system 1408 to perform a diagnostic scan. The station controller 1414 provides a diagnostic report to the customer (e.g., via an affiliated software application) and may offer one or more repair services. The station controller 1414 receives confirmation of selected services and then causes the vehicle repair system 1408 to perform the selected services. In a second example, the station controller 1414 receives information indicating arrival of an AV. In response, the station controller 1414 requests and receives diagnostic information from the AV, such as last aesthetic services (e.g., vehicle wash or vehicle detail), last repair services, current sensor measurements (e.g., battery status, tire pressure measurements, etc.). Based on the diagnostic information, the station controller 1414 provides a diagnostic report to the customer and may offer one or more repair services. In a third example, for AVs under contract (e.g., a non-affiliated fleet) with the AV station 1400 (or an associated network), secondary services are provided based on terms of the contract. In a fourth example, for an affiliated AV fleet, secondary services are provided based on predetermined conditions (e.g., periodic services provided to AVs, based on status, etc.).

In an embodiment, the billing system 1416 is responsible for billing for the services performed at the AV station 1400. As shown in FIG. 14, the billing system 1416 includes services database 1422, dynamic pricing module 1424, and customer database 1426. The services database 1422 includes a dynamic list of the primary and secondary services offered at the AV station 1400. The customer database 1426 includes a list of customer accounts of the AV station 1400 or of the network with which the station is associated. The customer accounts includes payment information, preferences, and subscription information. Further, the billing system 1416 includes a dynamic pricing module 1426. The dynamic pricing module 1426 determines the cost of a service based on factors including customer loyalty, market pricing, and promotional offers. The dynamic pricing module 1426 also determines whether service is provided as part of a subscription or on a pay-per-use basis.

Figure 17:
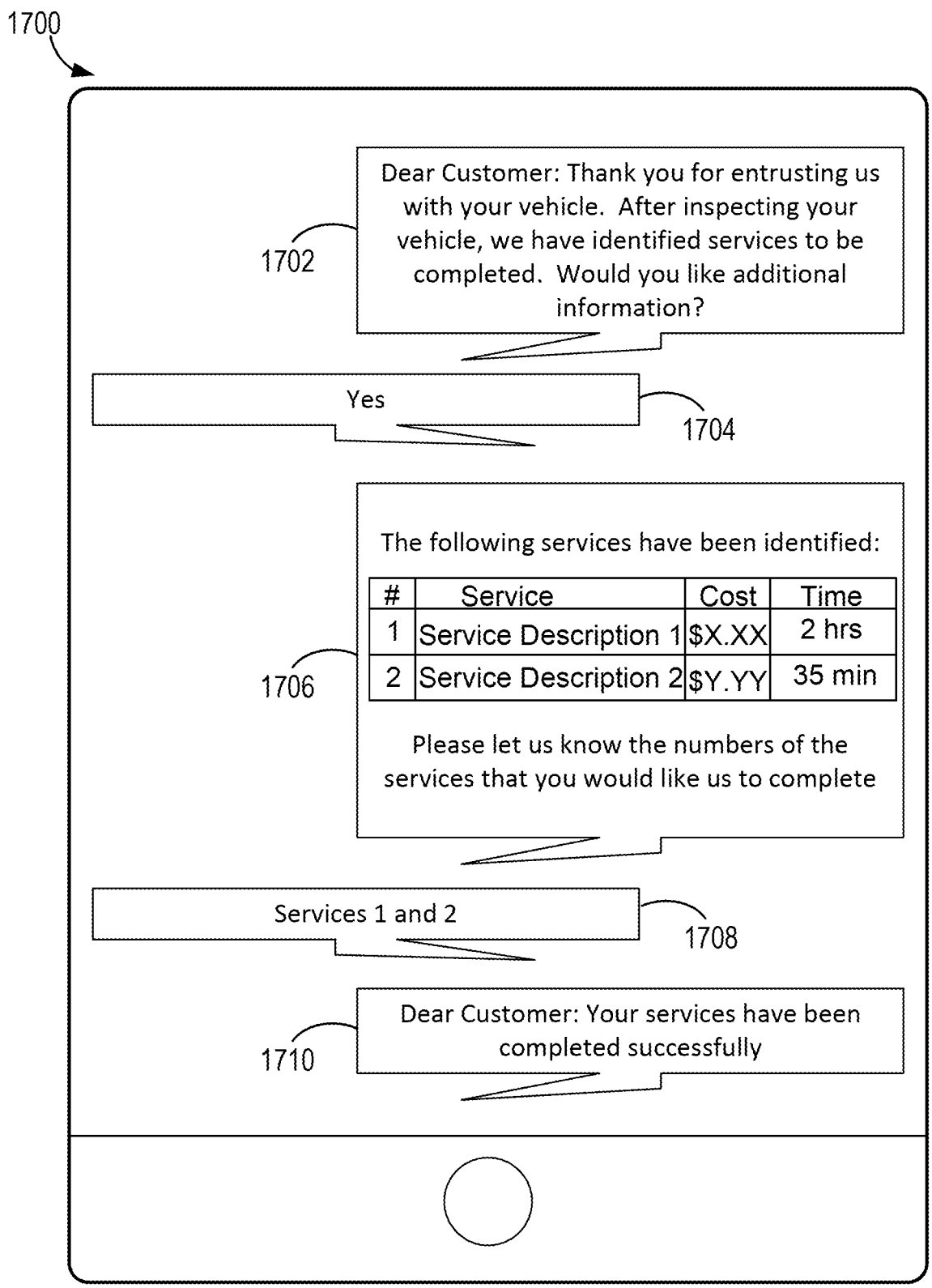
FIG. 17 shows a graphical user interface (GUI) of a software application associated with an autonomous vehicle station.

In an embodiment, the station controller 1414 provides the billing system 1416 with a pricing request for one or more secondary services to be offered in connection with an AV. The request also includes identifying information of the AV or of a customer associated with the AV. The billing system 1416 uses the information to calculate a price for each of the requested services and provides the prices to the station controller 1414. In some examples, the station controller 1414 communicates the prices to the customer associated with the AV (e.g., as shown in FIG. 17).

Figure 15:
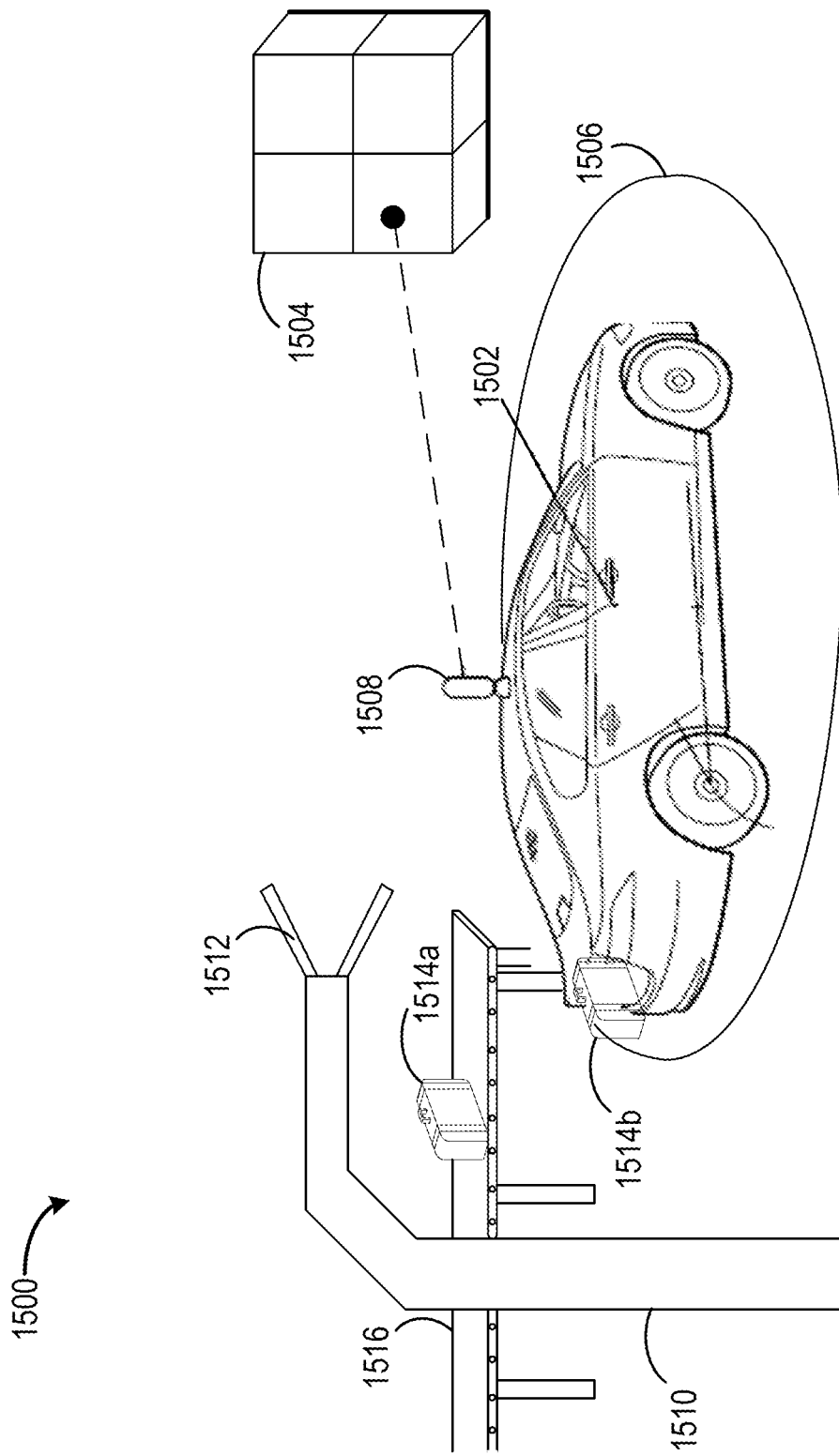
FIG. 15 shows an example autonomous vehicle station.

FIG. 15 shows an example AV station 1500. As shown in FIG. 15, the AV station 1500 includes a pick-up/drop-off system that includes robotic arm 1510 and conveyor belt 1516. The AV station 1500 also includes a vehicle storage system that includes a vehicle turntable 1506, and a calibration system that includes calibration target 1504. Accordingly, the AV station 1500 offers pick-up/drop-off, vehicle storage, and sensor calibration services.

In an example, an AV 1502 arrives at the AV station 1500 for a primary service. In this example, the primary service is pick-up/drop-off. During a pick-up/drop-off service, the robotic device 1510 manipulates objects using end-effector 1512. More specifically, during a pick-up service, the robotic device 1510 may remove objects, such as luggage 1514*a*, from the conveyor belt 1516 and place the objects into the AV 1502. Conversely, during a drop-off service, the robotic device 1510 may remove objects, such as luggage 1514*b*, from the AV 1502 and place the objects onto the conveyor belt 1516.

During the pick-up/drop-off service, a station controller (not illustrated in FIG. 15) determines to provide one or more secondary services in connection with the AV 1502. In this example, the station controller determines to offer a calibration service or a parking service. The calibration service calibrates one or more sensors of the AV (e.g., sensor 1508), and the parking service stores the vehicle for a specified period of time. As shown in FIG. 15, because the calibration target 1504 and the vehicle turntable 1506 are located in proximity of the pick-up/drop-off system, the secondary services are conveniently performed. For example, sensor calibration is performed while the pick-up/drop-off service is being performed, and the parking service is provided as soon as the pick-up/drop-off service is completed.

Network of Autonomous Vehicle Stations

Figure 16:
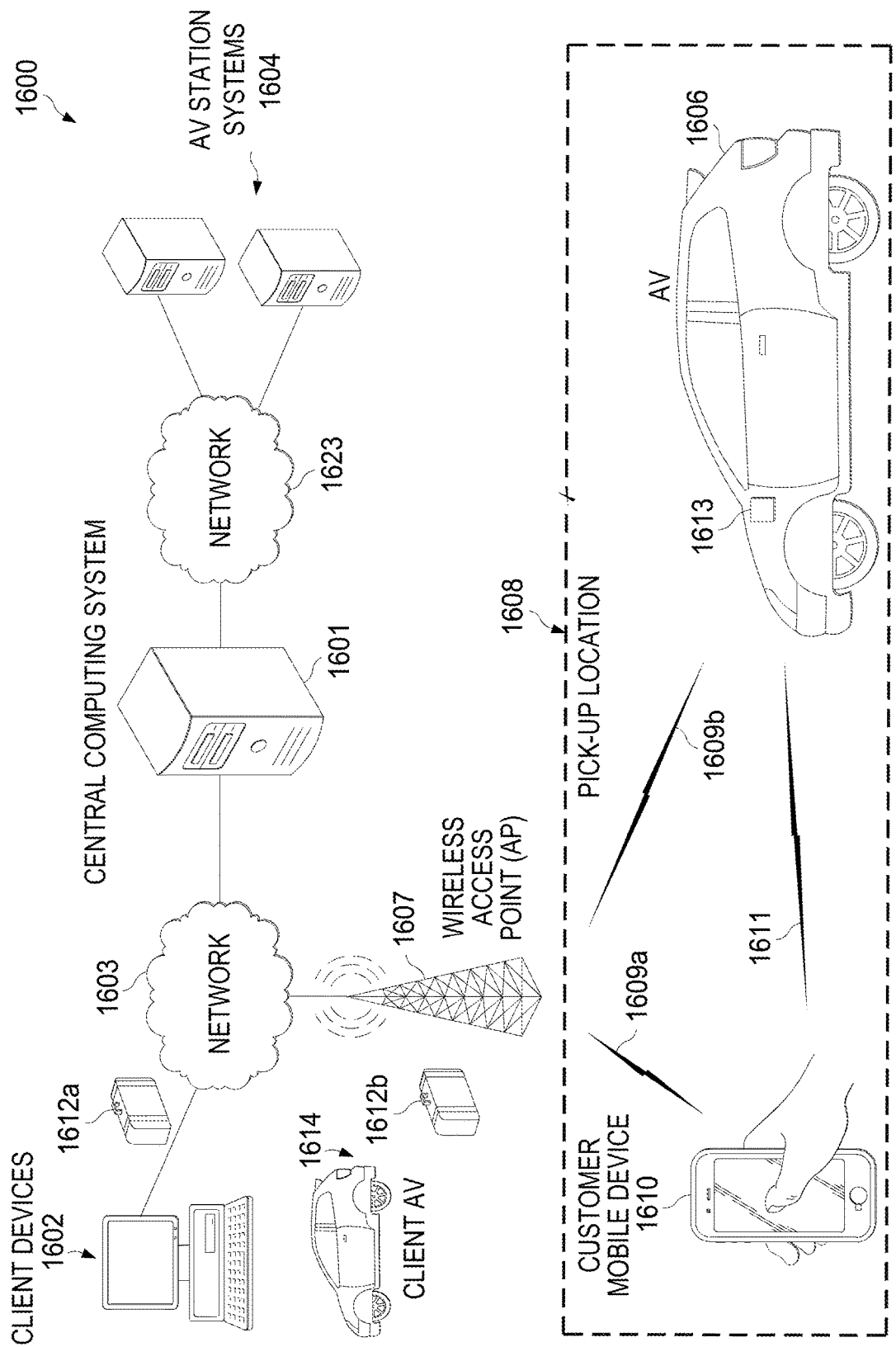
FIG. 16 shows a system for managing a network of autonomous vehicle stations.

FIG. 16 shows a system 1600 for managing a network of AV stations. In an embodiment, the system 1600 includes a central computing system 1601 (e.g., one or more server computers), client devices 1602 (e.g., desktop computers, mobile devices, Kiosks), client AVs 1614 (e.g., non-affiliated AVs), networks 1603, 1623 (e.g., Internet or other wide area network), AV station systems 1604 (e.g., each associated with an AV station of the network), access point 1607 (e.g., WiFi routers, cell towers), AV 1606, and customer mobile device 1610 (e.g., a smartphone, tablet computer, wearable computer).

In an operation, a customer uses a client device 1602 to request a primary service from the central computing system 1601. In an example, the customer is a passenger requesting an AV for pick-up/drop-off. In another example, the customer is a network operator of the network of AV stations. The customer's request includes but is not limited to: a pick-up date, a drop-off date, a pick-up time window, pick-up and drop-off locations, a number of passengers (if any), a number of objects to be transported, identities and other personal information of the passenger(s), if any, and description(s) of the object(s). The description of an object includes but is not limited to: the physical characteristics of the object (e.g., height, width, length, weight, color), type of object (e.g., luggage, cargo, skis, animals), transport or shipping requirements (e.g., refrigerated storage, secure storage), and any other data or information that can be used to identify or describe the object.

Further, the request indicates whether the customer is requesting transportation (of the customer and/or an object) to the AV station where the primary service is to be performed. If the customer requests transportation, the central computing system 1601 matches the customer with an affiliated AV that provides transportation to the AV station. If the customer does not request transportation, then the central computing system 1601 determines that the customer will be using a non-affiliated AV to be transported to the AV station. In the example of FIG. 16, there are two customers. A first customer uses client device 1602 that provides, over network 1603 to the central computing system 1601, object description 1612*a* and requests transportation to the AV station. A second customer, which is associated with client AV 1614, uses another client device that provides, over network 1603 to the central computing system 1601, object description 1612*b* and information indicative of the client AV 1614.

Accordingly, in an embodiment, the central computing system 1601 determines to match the first customer with an AV. To do so, the central computer system 1601 searches AV inventory in a fleet database to select an AV to match to the first customer. In particular, the central computer system 1601 uses one or more factors, such as the information found in the request (e.g., pick-up location, number of passengers, etc.), to select an AV. In the example of FIG. 16, autonomous vehicle 1606 is matched to the first customer.

After the AV 1606 is matched to customer, AV stations at which the primary services are to be provided are selected. In an embodiment, client AV 1614 (i.e., a non-affiliated AV) and AV 1606 (i.e., an affiliated AV) store locations of the AV stations in the network. In this embodiment, both client AV 1614 and AV 1606 may determine an optimal route to one of the AV stations in the network (e.g., a nearest AV station to the AV that provides the primary service). Note that the AVs may also use the locations of the AV stations to determine a default location where the AV can go for emergency repairs, charging, sensor malfunction, or other scenarios where the AV may need a 'safe stop' location. In some examples, an AV continuously or periodically determines a nearest AV station and one or more routes to the nearest AV station. As such, the nearest AV station is always known to the AV. Doing so enables the AV to rapidly begin traveling toward the nearest AV station in case of an emergency, malfunction, or battery depletion.

In another embodiment, the central computing system 1601 selects an AV station at which to provide the respective primary service for each of the first customer and the second customer. In particular, the selection is based on one or more factors, such as the service requested, the location of the customer, and availability at the AV stations. Once the central computing system 1601 has selected the AV stations, the central computing system 1601 provides over network 1623 the associated AV station systems 1604 with information indicative of the primary services to be provided to the customers and arrival details of the customers.

In an embodiment, the central computing system 1601 informs the second customer and/or the client AV 1614 of the selected AV station for the second customer. The second customer uses the client AV 1614 to be transported to the selected AV station. On the other hand, for the first customer, on or before the pick-up date, central computer system 1601 configures the computer system 1613 on the AV 1606 including downloading reservation details, such as the identities of any passengers, the description 1612a of the object, the AV station selected for the first customer. For example, the reservation details are downloaded through network 1603 and AP 1607 to the AV computer system 1613 using an over-the-air (OTA) update via wireless communication link 1609b. After being configured, the AV 1606 is dispatched to the pick-up location 1608. At some time within the pick-up time window (e.g., 30 minutes), the AV 1606 arrives at the pick-up location 1608, where the AV 1606 is greeted by the first customer.

At the pick-up location 1608, the first customer uses a mobile device 1610 to authenticate with the AV computer system 1613 over wireless communication link 1611. In an embodiment, the mobile device 1610 authenticates with central computer system 1601 over wireless communication link 1609a, AP 1607 (e.g., a cell tower) and network 1603 (e.g., the Internet). In an embodiment, passenger authentication data includes passenger credentials (e.g., user ID, passcode), client mobile device ID, timestamp, geographic location, biometric data (e.g., fingerprint, retina scan, faceprint, etc.), and any other or additional data that can be used to authenticate the passengers (e.g., cryptographic data, such as symmetric keys, etc.). Upon successful authentication, the AV 1606 opens its passenger doors and its storage space, which in this example is a trunk. The first customer can load objects into the storage space of the AV 1606.

After the first customer is authenticated, the passenger doors are unlocked and the first customer enters the AV 1606. In an embodiment, one or more sensors inside the AV passenger compartment perform an additional authentication of the first customer to confirm that only authorized passengers have entered the AV 1306. For example, a wireless access point in the AV 1606 initiates passenger authentication by sending an authentication request to the first customer's personal device, or using a one or more of a touch sensitive display, biometric scanner or speech recognition system in the passenger compartment to obtain credentials from each passenger. After the first customer is authenticated, the passenger doors are shut and the AV 1606 is operated to drive to the scheduled drop-off location according to a route plan generated by the AV 1606 planning module or by the central computer system 1601.

In an embodiment, one or more sensors inside the storage space scan and measure the physical characteristics of the first customer's objects. For example, a camera can scan and measure the physical characteristics of each object in the storage space, such as the height, width, length and weight of each object. A digital scale built-in to the bottom of the storage space can weigh the objects. The scale can be segmented so that each object can be weighed separately to avoid each object being loaded and weighed separately. The weight of the object can be used to ensure that the load capacity of the AV 1606 is not exceeded and/or to determine a fee for transporting the object based on its weight. In embodiments where the primary service is drop-off at the a transportation hub, the weight of the object is used to inform the first customer of any expected excess weight charges that are charged to the first customer at the transportation hub. In such embodiments, the storage space also includes a printing device that prints identification tags for the objects (e.g., to save time at the transportation hub).

Once the AV 1606 and the client AV 1614 arrive at the respective AV stations, the associated AV station systems 1604 causes the relevant systems to perform primary services. The AV station systems 1604 also provides the central computer system 1601 with status updates of the primary services. Furthermore, as explained in FIG. 14, the AV station systems 1604 also determines one or more secondary services to provide in connection with the AV 1606 and/or the client AV 1614. The AV station systems 1604 also provides the central computer system 1601 with status updates of the secondary services that are performed (if any). Furthermore, in some examples, the AV station systems 1604 communicates with the first and second customers to receive approval of the one or more secondary services, perhaps using a software application associated with the system 1600.

FIG. 17 shows a graphical user interface (GUI) of a software application associated with an AV station network. The software application is executed by a client device 1700. As described above, the software application is used to an AV station system to obtain approval from a customer to perform one or more secondary services. In the example of FIG. 17, the AV station system is requesting approval for one or more secondary services for an AV that is being stored at an AV station associated with the system.

At 1702, the AV station system sends to a customer a communication stating "Dear Customer: Thank you for entrusting us with your vehicle. After inspecting your vehicle, we have identified services to be completed. Would you like additional information?" At 1704, the customer replies "Yes." At 1706, the AV station system provides the customer with one or more secondary services. The AV station system also provides additional information, such as time and cost of the secondary services. At 1708, the customer selects the one or more secondary services to be performed. At 1710, the AV station provides the customer with an update regarding the selected secondary services.

Operation of an Autonomous Vehicle Station

Figure 18:
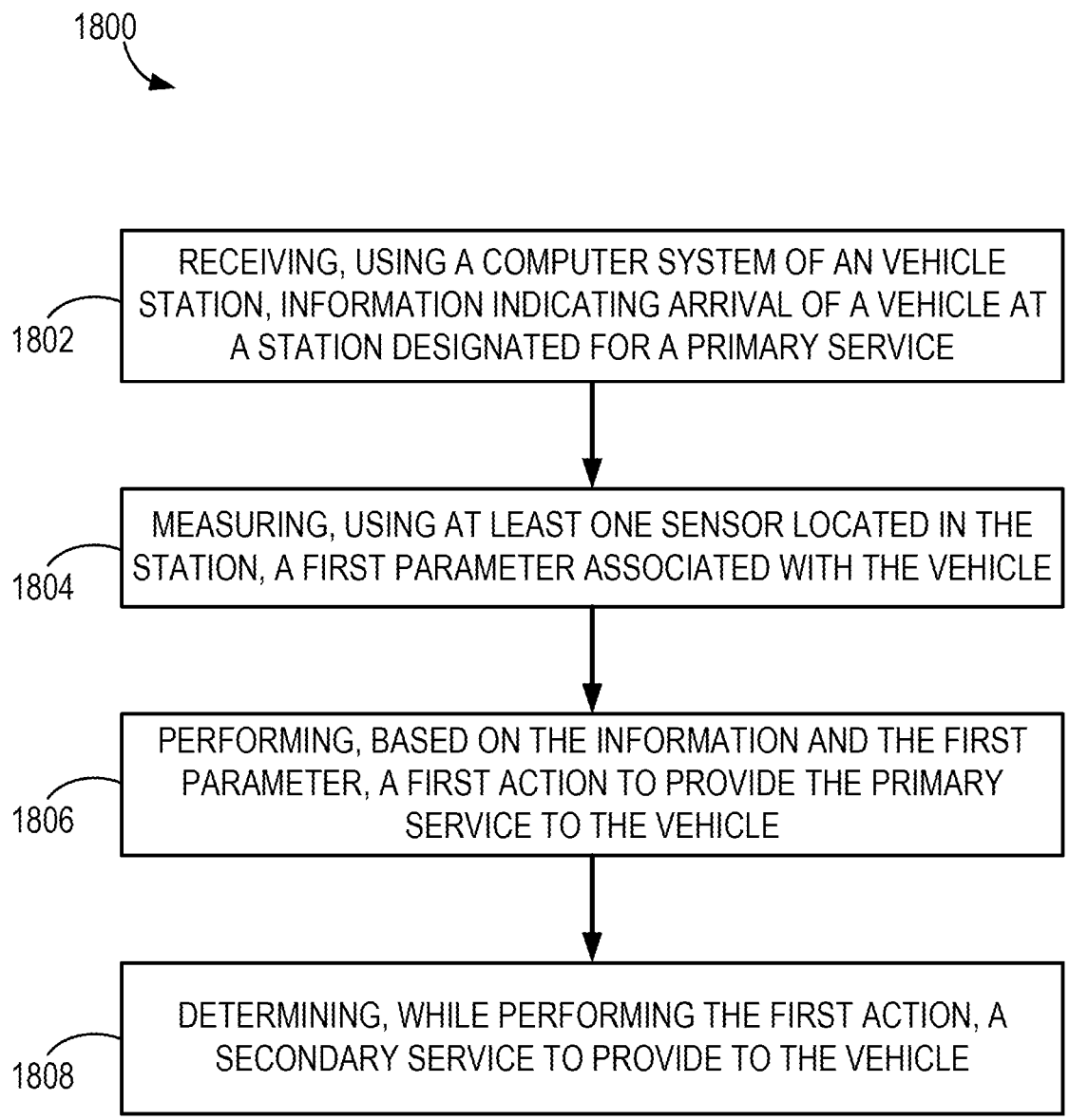
FIG. 18 shows a flowchart of an example method of operating an autonomous vehicle station.

FIG. 18 shows an example flowchart of a process 1800 for operating an AV station. For example, the process could be carried out by the station controller 1414 of FIG. 14. Information (e.g., a request from a vehicle to use the station for a primary service, instructions received from a central server of a station network, or detecting arrival of the vehicle using sensors at the station) is received 1802 indicating arrival of a vehicle at a station (e.g., one of a network of strategically located vehicle stations) designated for a primary service (e.g., pickup/drop-off, safe AV storage (e.g., long or short term), or a safe location for conducting transactions). In an embodiment, the station is the station 1400 shown in FIG. 14.

A first parameter (e.g., presence/location of a payload or dimensions of the vehicle) associated with the vehicle is measured 1804 using at least one sensor (e.g., cameras, vehicle diagnostic tools) located in the station. In an embodiment, the vehicle is the autonomous vehicle 1502 shown in FIG. 15. A first action (e.g., removing/placing luggage, activating security cameras, operating a vehicle turntable) is performed 1806 based on the information and the first parameter to provide the primary service to the vehicle. A secondary service (e.g., vehicle charging, vehicle repair, sensor calibration) to be provided to the vehicle is determined 1808 while performing the first action.

In some implementations, the station further includes a robotic arm including an end-effector (e.g., a gripper), the primary service is a passenger pickup or drop-off service, and the first parameter includes a location of a payload (e.g., luggage or cargo) in the vehicle (e.g., a camera determines the location of the luggage in the AV). In an embodiment, the robotic arm is the robotic device 1510 shown in FIG. 15. In these implementations performing an action to provide the primary service to the vehicle involves causing the robotic arm to remove the payload from the vehicle (e.g., by causing the end-effector of the robotic arm to move in proximity of the payload, and using the end-effector to remove the payload from the AV).

In some implementations, the vehicle is a transportation vehicle associated with the station, and receiving information indicating arrival of the vehicle at the station involves receiving a pick-up request, the pick-up request including a customer identifier, a pick-up location, a drop-off location, a pick-up date, and a pick-up time window; determining that the drop-off location is near the station (e.g., within a predetermined threshold distance); assigning the pick-up request to the vehicle; and receiving a confirmation from the vehicle indicating that the vehicle has performed the pick-up.

In some implementations, the vehicle is one of a transportation vehicle fleet, and selecting the vehicle to fulfill the pick-up request involves selecting, based on the pick-up request and a location of the vehicle, the vehicle from the fleet.

In some implementations, performing an action to provide the primary service to the vehicle further involves determining, based on the request (e.g., identifying information included in the request), a destination (e.g., terminal number, travel provider counter number) for the payload; and routing the payload to the destination (e.g., via a motorized lifting platform with a conveyer belt). In an embodiment, the payload is the luggage 1514a shown in FIG. 15.

In some implementations, the station is located near a transportation hub (e.g., airport, central station, train station).

In some implementations, the station further includes a vehicle turntable (e.g., located in a loading dock), the primary service is vehicle storage, and performing an action to provide the primary service to the vehicle involves operating the vehicle turntable to move the vehicle to a parking location in the station. In an embodiment, the vehicle turntable is the vehicle turntable 1506 shown in FIG. 15.

In some implementations, the station further includes at least one calibration target, the secondary service is calibration of at least one vehicle sensor, and the method further involves: instructing the vehicle (e.g., by communicating with the AV via the communications interface) to use the at least one calibration target to calibrate the at least one vehicle sensor (e.g., cameras, radars, LiDAR). In an embodiment, the calibration target is the calibration target 1504 shown in FIG. 15.

In some implementations, determining the secondary service to provide to the vehicle involves using the at least one sensor to measure a second parameter (e.g., diagnostic vehicle parameter, such as tire pressure, software status, battery charge, sensor calibration) of the vehicle; determining, based on the second parameter, the secondary service to provide to the vehicle; and performing a second action (e.g., scheduling a vehicle repair, calibrating vehicle sensors, charging a vehicle battery, updating/resolving software) to provide the secondary service to the vehicle.

In some implementations, the at least one sensor includes a vehicle diagnostic tool (e.g., an OBDII Scanner, a wireless scanner), the second parameter is a diagnostic parameter (e.g., parameter indicative of a status battery, software, tire pressure, or other AV part), the secondary service is a vehicle repair service, and performing a second action to provide the secondary service to the vehicle involves scheduling a vehicle repair service for the vehicle.

In some implementations, performing the second action to provide the secondary service to the vehicle further involves identifying, using the information and a customer database, a customer associated with the vehicle; determining, based on (i) a type of the customer (e.g., corporate vs. private customer), (ii) a pricing schedule associated with the customer, and (iii) the vehicle repair service, a price of the vehicle repair service; and billing the customer for the vehicle repair service.

In some implementations, billing the customer for the vehicle repair service involves: sending, to a device associated with the customer, a report indicative of the vehicle repair service and a request for authorizing the vehicle repair service; receiving, from the device, authorization to perform the vehicle repair service; and in response, sending to the device a bill for the vehicle repair service. In an embodiment, the device associated with the customer is the customer mobile device 1610 shown in FIG. 16.

In some implementations, the station further includes a wireless battery charger, the secondary service is charging a battery of the vehicle, and wherein the method further involves causing the wireless battery charger to charge a battery of the vehicle.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system comprising:
   a communications interface;
   at least one computer; and
   memory storing instructions that when executed by the at least one computer, cause the at least one computer to perform operations comprising:
   receiving information indicating arrival of a vehicle at a station designated for a primary service;
   measuring, using at least one sensor located in the station, a first parameter associated with the vehicle, wherein the first parameter comprises a location of a payload in the vehicle;
   performing, based on the information and the first parameter, a first action to provide the primary service to the vehicle, wherein performing the first action to provide the primary service to the vehicle comprises removing the payload from the vehicle and routing the payload to a destination via a conveyor belt; and
   determining, while performing the first action to provide the primary service, a secondary service to provide to the vehicle.

2. The system of claim 1, wherein the system further comprises a robotic arm including an end-effector, wherein the primary service is a passenger pickup or drop-off service, wherein performing the first action to provide the primary service to the vehicle comprises:
   causing the robotic arm to remove the payload from the vehicle.

3. The system of claim 2, wherein the vehicle is a transportation vehicle associated with the station, and wherein receiving information indicating arrival of the vehicle at the station comprises:
   receiving a pick-up request, the pick-up request including a customer identifier, a pick-up location, a drop-off location, a pick-up date, and a pick-up time window;
   determining that the drop-off location is near the station;
   assigning the pick-up request to the vehicle; and
   receiving a confirmation from the vehicle indicating that the vehicle has performed the pick-up.

4. The system of claim 3, wherein the vehicle is one of a transportation vehicle fleet, and wherein selecting the vehicle to fulfill the pick-up request comprises:
   selecting, based on the pick-up request and a location of the vehicle, the vehicle from the fleet.

5. The system of claim 3, wherein performing the first action to provide the primary service to the vehicle further comprises:
   determining, based on the pick-up request, a destination for the payload; and
   routing the payload to the destination.

6. The system of claim 1, wherein the system further comprises a vehicle turntable, wherein the primary service is vehicle storage, and wherein performing the first action to provide the primary service to the vehicle comprises:
   operating the vehicle turntable to move the vehicle to a parking location in the station.

7. The system of claim 1, wherein the system further comprises at least one calibration target, wherein the secondary service is calibration of at least one vehicle sensor, and wherein the operations further comprise:
   instructing the vehicle to use the at least one calibration target to calibrate the at least one vehicle sensor.

8. The system of claim 1, wherein determining the secondary service to provide to the vehicle comprises:
   using the at least one sensor to measure a second parameter of the vehicle;
   determining, based on the second parameter, the secondary service to provide to the vehicle; and
   performing a second action to provide the secondary service to the vehicle.

9. The system of claim 8, wherein the at least one sensor comprises a vehicle diagnostic tool, wherein the second parameter is a diagnostic parameter, wherein the secondary service is a vehicle repair service, and wherein performing a second action to provide the secondary service to the vehicle comprises:
   scheduling a vehicle repair service for the vehicle.

10. The system of claim 9, wherein performing the second action to provide the secondary service to the vehicle further comprises:
    identifying, using the information and a customer database, a customer associated with the vehicle;
    determining, based on (i) a type of the customer, (ii) a pricing schedule associated with the customer, and (iii) the vehicle repair service, a price of the vehicle repair service; and
    billing the customer for the vehicle repair service.

11. The system of claim 10, wherein billing the customer for the vehicle repair service comprises:
    sending, to a device associated with the customer, a report indicative of the vehicle repair service and a request for authorizing the vehicle repair service;
    receiving, from the device, authorization to perform the vehicle repair service; and
    in response, sending to the device a bill for the vehicle repair service.

12. The system of claim 1, wherein the system further comprises a wireless battery charger, wherein the secondary service is charging a battery of the vehicle, and wherein the operations further comprise:
    causing the wireless battery charger to charge a battery of the vehicle.

13. The system of claim 1, wherein the station is one of a network of stations, wherein the vehicle stores locations of the stations in the network.

14. The system of claim 1, wherein the vehicle is configured to:
    periodically determine a nearest station to the vehicle; and
    map a route to the nearest station, where the nearest station is a default destination in case of emergency repairs, charging, or sensor malfunction.

15. A method comprising:
    receiving, using a computer system of a vehicle station designated for a primary service, information indicating arrival of a vehicle at the vehicle station;
    measuring, using at least one sensor located in the vehicle station, a first parameter associated with the vehicle, wherein the first parameter comprises a location of a payload in the vehicle;
    performing, based on the information and the first parameter, a first action to provide the primary service to the vehicle, wherein performing the first action to provide the primary service to the vehicle comprises removing the payload from the vehicle and routing the payload to a destination via a conveyor belt; and
    determining, using the computer system and while performing the first action to provide the primary service, a secondary service to provide to the vehicle.

16. The method of claim 15, wherein the vehicle station further comprises a robotic arm including an end-effector, wherein the primary service is a passenger pickup or drop-off service, wherein performing the first action to provide the primary service to the vehicle comprises:
  causing, using the computer system, the robotic arm to remove the payload from the vehicle.

17. The method of claim 16, wherein the vehicle is a transportation vehicle associated with the vehicle station, and wherein receiving information indicating arrival of the vehicle at the vehicle station comprises:
  receiving a pick-up request, the pick-up request including a customer identifier, a pick-up location, a drop-off location, a pick-up date, and a pick-up time window;
  determining that the drop-off location is near the vehicle station;
  assigning the pick-up request to the vehicle; and
  receiving a confirmation from the vehicle indicating that the vehicle has performed the pick-up.

18. The method of claim 17, wherein the vehicle is one of a transportation vehicle fleet, and wherein selecting the vehicle to fulfill the pick-up request comprises:
  selecting, based on the pick-up request and a location of the vehicle, the vehicle from the fleet.

19. A non-transitory computer-readable storage medium comprising one or more programs for execution by one or more processors of a first device, the one or more programs including instructions which, when executed by the one or more processors, cause the first device to perform operations comprising:
  receiving information indicating arrival of a vehicle at a station designated for a primary service;
  measuring, using at least one sensor located in the station, a first parameter associated with the vehicle, wherein the first parameter comprises a location of a payload in the vehicle;
  performing, based on the information and the first parameter, a first action to provide the primary service to the vehicle, wherein performing the first action to provide the primary service to the vehicle comprises removing the payload from the vehicle and routing the payload to a destination via a conveyor belt; and
  determining, while performing the first action to provide the primary service, a secondary service to provide to the vehicle.

20. The system of claim 1, wherein the first parameter further comprises dimensions of the vehicle.

* * * * *